United States Patent [19]

Asakura et al.

[11] Patent Number: 5,132,075

[45] Date of Patent: Jul. 21, 1992

[54] METHOD AND APPARATUS FOR WATER CHEMISTRY DIAGNOSIS OF ATOMIC POWER PLANT

[75] Inventors: Yamato Asakura, Katsuta; Makoto Nagase, Hitachi; Motoaki Utamura, Hitachi; Shunsuke Uchida, Hitachi, all of Japan

[73] Assignee: Hitachi, Ltd., Tokyo, Japan

[21] Appl. No.: 475,962

[22] Filed: Feb. 6, 1990

[30] Foreign Application Priority Data

Feb. 6, 1989 [JP] Japan ................................. 1-027145

[51] Int. Cl.$^5$ ............................................. G21C 19/42
[52] U.S. Cl. .................... 376/310; 376/256; 376/245; 376/305
[58] Field of Search ............... 376/310, 256, 245, 305; 210/743, 746

[56] References Cited

U.S. PATENT DOCUMENTS

| | | | |
|---|---|---|---|
| 4,853,638 | 8/1989 | Endou et al. | 324/441 |
| 4,880,595 | 11/1989 | Matsuda et al. | 376/310 |
| 4,937,038 | 6/1990 | Sakai et al. | 376/245 |

FOREIGN PATENT DOCUMENTS 59-60293 4/1984 Japan .
61-68593 4/1986 Japan .

OTHER PUBLICATIONS

Structural Material Anomaly Detection System Using Water Chemistry Data, (IV) Diagnosis of Causes of Anomaly in Water Chemistry by Analysing Correlations Between Conductivity and pH Data by Yamato Asakura et al. Journal of Nuclear Science and Technology vol. 27, No. 7, pp. 617-625 Jul. 1990.
Diagnosis of Causes of Anomaly in Water Chemistry by Analysing Correlations.
Between Conductivity and pH data by Yamato Asakura et al.
Journal of Nuclear Science And Technology vol. 27, No. 7, pp. 617-625 Jul. 1990.

Primary Examiner—Brooks H. Hunt
Assistant Examiner—Meena Chelliah
Attorney, Agent, or Firm—Antonelli, Terry, Stout & Kraus

[57] ABSTRACT

Measurement values of conductivity of pH of water in the primary cooling water system of a boiling water atomic power plant are input through on-line and the measurement values of conductivity and pH at times of measurement when water quality changes are compared with values at the time of normal operation. Tendencies to increase or decrease the conductivity and pH are combined to prepare one diagnosis data, and causes of anomaly in progress in component apparatus members are discriminated and diagnosed by the diagnosis data. By using a correlation between logarithm of conductivity and pH in preparing the diagnosis data from combinations of conductivity and pH, causes of anomaly can be diagnosed more accurated.

14 Claims, 8 Drawing Sheets

| SAMPLING POINT | | | CAUSE OF ANOMALY |
|---|---|---|---|
| CONDENSER OUTLET 8 | CD OUTLET 9 | REACTOR WATER 10 | |
| (1) [conductivity vs pH: point] | [conductivity vs pH: point] | [conductivity vs pH: negative slope, b≈-1] | ○ RESIN INTRUSION (H₂SO₄)<br>○ ORGANIC IMPURITY INTRUSION (H₂CO₃) |
| (2) | [conductivity vs pH: point] | [conductivity vs pH: point] | LEAKAGE OF SEA WATER |
| (3) [conductivity vs pH: vertical line] | [conductivity vs pH: positive slope, b≈1] | [conductivity vs pH: positive slope] | LEAKAGE OF SEA WATER WITH DEPLETED CD CATION RESIN |
| (4) | [conductivity vs pH: negative slope, b≈-1] | [conductivity vs pH: negative slope] | LEAKAGE OF SEA WATER WITH DEPLETED CD ANION RESIN |
| (5) | [conductivity vs pH: vertical line] | [conductivity vs pH: vertical line] | LEAKAGE OF SEA WATER WITH DEPLETED CD CATION AND ANION RESIN |
| (6) [conductivity vs pH: point] | [conductivity vs pH: positive slope, b≈1] | [conductivity vs pH: positive slope] | INCOMPLETE REGENERATION OF CD RESIN (NaOH OUTFLOW) |

FIG. 3

| PLANT | COEFFICIENT | | CORRELATION FACTOR |
|---|---|---|---|
| | a | b | |
| A | 5.6 | -1.0 | -0.65 |
| B | 5.1 | -0.88 | -0.99 |
| C | 6.3 | -1.1 | -0.98 |
| D | 4.5 | -0.82 | -1.0 |
| E | 5.4 | -0.9 | -0.64 |
| F | 4.9 | -0.84 | -0.98 |
| G | 4.2 | -0.79 | -0.85 |
| H | 4.9 | -0.9 | -0.48 |

| SAMPLING POINT | | | CAUSE OF ANOMALY |
|---|---|---|---|
| CONDENSER OUTLET 8 | CD OUTLET 9 | REACTOR WATER 10 | |
| conductivity vs pH (point) | conductivity vs pH (point) | conductivity vs pH (line, b≃−1) | ○ RESIN INTRUSION ($H_2SO_4$)<br>○ ORGANIC IMPURITY INTRUSION ($H_2CO_3$) |
| | conductivity vs pH (point) | conductivity vs pH (point) | LEAKAGE OF SEA WATER |
| conductivity vs pH (vertical line) | conductivity vs pH (vertical line) | conductivity vs pH (positive slope line) | LEAKAGE OF SEA WATER WITH DEPLETED CD CATION RESIN |
| conductivity vs pH (vertical line) | conductivity vs pH (vertical line) | conductivity vs pH (negative slope line) | LEAKAGE OF SEA WATER WITH DEPLETED CD ANION RESIN |
| | conductivity vs pH (vertical line) | conductivity vs pH (vertical line) | LEAKAGE OF SEA WATER WITH DEPLETED CD CATION AND ANION RESIN |
| conductivity vs pH (point) | conductivity vs pH (vertical line) | conductivity vs pH (positive slope line) | INCOMPLETE REGENERATION OF CD RESIN (NaOH OUTFLOW) |

METHOD AND APPARATUS FOR WATER CHEMISTRY DIAGNOSIS OF ATOMIC POWER PLANT

BACKGROUND OF THE INVENTION

This invention relates to a method and an apparatus for diagnosis of anomaly of an atomic power plant on the basis of water chemistry data, and particularly to a method and an apparatus for water chemistry diagnosis of a boiling water atomic power plant suitable for detecting causes of anomaly to take countermeasures against them early.

Water quality control of a boiling water atomic power plant is carried out on the basis of on-line data obtained by continuously monitoring the conductivity, pH, etc. and off-line data obtained by chemical analysis of periodically grabbed sampling water, such as concentrations of corrosion products, chemical impurities, etc. In order to exactly detect anomalies of operating states of an atomic power plant and component apparatus members from fluctuations in water quality by the conventional water chemistry diagnosis system, only on-line data are not enough, but also off-line data are required, and thus water quality control operators bear a heavy burden during the fluctuations in water quality.

As a system for detecting anomalies taking place in the component apparatus members from water chemistry data, a method for diagnosing anomaly occurrences by comparing patterns of ion concentration increase and decrease in water at sampling points in the primary cooling water system of a nuclear reactor with standard patterns of each cause of anomaly prepared in advance is known, as disclosed in Japanese Patent Application Kokai (Laid-open) No. 59-60293. However, in actual plants there are not only externally intruded impurities, but also corrosion products in an ionic state in the water passing through the primary cooling system of an atomic plant, and thus the species of involved ions are so many that it is quite hard to exactly detect causes of anomaly only from the increase and decrease of ion concentrations.

Japanese Patent Application Kokai (Laid-open) No 61-68593 proposes to make overall control of water chemistry data and find anomalies of an atomic power plant with respect to water quality early by inputting water chemistry data of the atomic power plant into a data file through on-line or off-line and making overall data processing and discloses diagnosis of anomaly by comparison of water chemistry data having a chemical correlation, for example, conductivity and pH, as one example of diagnosis of anomaly, but the prior art neither specifically discloses how an anomaly is diagnosed by comparison of i.e. conductivity with pH, nor takes it into consideration to identify causes of anomaly on the basis of comparison of i.e. conductivity with pH. That is, water chemistry data contain information on the state of a plurality of component apparatus members and thus it is difficult to exactly identify causes of anomaly, that is, what anomaly takes place in which component apparatus member from comparison of conductivity with pH at one sampling point.

SUMMARY OF THE INVENTION

An object of the present invention is to provide a system for water chemistry diagnosis in an atomic power plant capable of identifying causes of anomaly from a correlation of water chemistry data on conductivity and pH.

Another object of the present invention is to provide a system for water chemistry diagnosis in an atomic power plant capable of exactly identifying causes of anomaly from a correlation of water chemistry data on conductivity and pH.

Other object of the present invention is to provide a system for water chemistry diagnosis in an atomic power plant capable of more exactly identifying causes of anomaly from water chemistry data on a combination of conductivity and pH.

These objects can be attained by measuring conductivity and pH at points susceptible to changes in water quality when failures take place in component apparatus members of an atomic power plant to determine a correlation between the logarithm of conductivity and pH, and comparing the thus determined correlation with a correlation between the logarithm of conductivity and pH prepared in advance for individual causes of anomaly.

These objects can be also attained by establishing the above-mentioned correlation between the logarithm of conductivity and pH from the values of conductivity and pH over the normal ranges of the conductivity and pH predetermined at sampling points of conductivity and pH.

Furthermore, these objects can be attained by measuring conductivity and pH at a plurality of points of different water quality state, for example, at a point upstream of a condensate demineralizer, a point downstream of the condensate demineralizer and a point downstream of feedwater heater in the primary cooling water system of a nuclear reactor, preparing one of diagnosis data from a combination of the conductivity and pH measured at each of the sampling points, and making overall comparison of diagnosis data obtained from a plurality of the sampling points, for example, comparing a combined pattern of a plurality of diagnosis data with the standard pattern prepared in advance for individual causes of anomaly.

The present invention is based on the following novel idea.

Conductivity of water at room temperature in the primary cooling water system depends mainly on a very small amount of ionic corrosion products when no impurities are intruded. When acidic impurities are intruded in the water of the primary cooling water system to increase the conductivity, an increment $\Delta x$ in the conductivity is given by the following equation (1) as a function of hydrogen ion concentration $C_H$ and anion concentration $C_A$ formed by electroltyic dissociation of the intruded impurties.

$$\Delta x = \lambda_H \cdot C_H + \lambda_A \cdot C_A \quad (1)$$

where $\lambda_H$ is an equivalent ionic conductivity of hydrogen ions and $\lambda_A$ is an equivalent ionic conductivity of anion species.

Since generally $\lambda_H > \lambda_A$ at room temperature, the equation (1) can be approximated by the following equation (2).

$$\Delta x \simeq \lambda_H \cdot C_H \quad (2)$$

That is, the increment x in the conductivity at room temperature is proportional to the hydrogen ion concentration.

Likewise, when basic impurities are intruded into the water of the primary cooling water system, the following equation (3) can be obtained.

$$\Delta x = \lambda_{OH} \cdot C_{OH} \tag{3}$$

wherein $\lambda_{OH}$ is an equivalent ionic conductivity of hydroxyl ions and $C_{OH}$ is a hydroxyl ion concentration. The increment $\Delta x$ in the conductivity at room temperature is proportional to the hydroxyl ion concentration.

Thus, a detection result of higher reliability can be obtained by analyzing a correlation between the conductivity and pH than by detecting intrusion of acidic and basic impurities only by pH measurement with a pH meter. Furthermore, when neutral impurities are intruded into the water of the primary cooling water system, no correlation is obtained between the conductivity and pH, and only conductivity is changed. That is, it is possible to detect the intrusion of neutral impurities that cannot be detected with a pH meter alone.

In establishing a correlation between the conductivity and pH by a statistical method, the correlation between the conductivity and pH is not linear and no universal correlations common to atomic power plants are obtained. Thus, it is difficult to prepare a correlation between the conductivity and pH in advance for individual causes of anomaly as a standard for comparison, and the applicability of diagnosis of anomaly to actual plants is not so high. The present inventors have found that a correlation between the logarithm of the conductivity and pH is linear and is universal and common to atomic power plants. That is, the applicability of diagnosis of anomaly to actual plants can be much enhanced by using the correlation between the logarithm of conductivity and pH.

Even if the component apparatus members are normally operated, the measurement values of conductivity and pH are fluctuated to some extent, and thus when a correlation is established from all of measurement values, there is such a possibility that a correlation clearly showing an abnormal state is not obtained between the conductivity and pH. Thus, it is desirable to use only data over the normal ranges at respective sampling points (where the normal ranges are calculated from water chemistry data on the conductivity and pH at the time of normal operation) as measurement data on the conductivity and pH for the statistical derivation to obtain a correlation.

The water chemistry data contain information on the state of a plurality of component apparatus members, and thus it is difficult to exactly identify causes of anomaly, that is, what anomaly takes place in which component apparatus, only from one diagnosis data on the basis of a combination of two kinds of water chemistry data, i.e. conductivity and pH, at one sampling point, because there are a plurality of causes of anomaly corresponding to the result of one diagnosis data. Thus, it is possible to more exactly identify causes of anomaly by overall comparison of a plurality of diagnosis data obtained at a plurality of sampling points in different water quality.

DETAILED DESCRIPTION OF THE PREFERRED EMBODIMENTS

A system for water chemistry diagnosis according to the present invention is given below as one embodiment. The present invention is not limited thereto, but includes various embodiments.

A system for water chemistry diagnosis for detection of anomalies from changes in water quality in a boiling water atomic power plant comprising a nuclear reactor, a turbine, a condenser, a condensate demineralizer and a feedwater heater as main component members, which comprises inputting measurement values of conductivity and pH of primary cooling water in the boiling water atomic power plant through on-line, comparing the measurement values of conductivity and pH at the respective times of measurement when changes in water quality are in progress with values at the time of normal operation, thereby classifying the comparison result into any of three cases consisting of a case of increase from the values at the time of normal operation, a case of decrease therefrom and a case of equal level, preparing one diagnosis data on the basis of a combination of the tendency of conductivity and pH to increase or decrease, and making an overall comparison of a plurality of diagnosis data at a plurality of sampling points, thereby discriminating and diagnosing causes of anomaly in progress through on-line.

For example, the above-mentioned system can be a system for water chemistry diagnosis for identifying causes of anomaly which comprises providing a conductivity meter and a pH meter each at three points, that is, a point upstream of the condensate demineralizer, a point downstream of the condensate demineralizer and a point downstream of the feedwater heater in the primary cooling water system of the nuclear reactor, combining two water chemistry data, i.e. conductivity as an index of ion concentration and pH as an index of hydrogen ion concentration, thereby preparing one diagnosis data, and making overall comparison of the thus prepared diagnosis data at the three points, thereby identifying causes of anomaly.

Specifically, a conductivity meter and a pH meter are provided at three points, i.e. a point ($P_1$) upstream of the condensate demineralizer, a point ($P_2$) downstream of the condensate demineralizer and a point ($P_3$) downstream of the feedwater heater to measure conductivity (A) and pH (B) at the three points through on-line.

On the basis of conductivity (a) and pH (b) at the time of normal operation as a standard, it can be discriminated and diagnosed through on-line that:

(1) when the conductivity and pH each at $P_1$, $P_2$ and $P_3$ are such that $A=a$ and $B=b$ at $P_1$, $A=a$ and $B=b$ at $P_2$ and $A>a$ and $B<b$ at $P_3$, leakage of the ion exchange resin of the condensate demineralizer and intrusion of organic impurities are in progress;

(2) when the conductivity and pH and at $P_1$, $P_2$ and $P_3$ are such that $A>a$ and $B=b$ at $P_1$, $A=a$ and $B=b$ at $P_2$ and $A=a$ and $B=b$ at $P_3$, leakage of sea water is in progress;

(3) when the conductivity and pH each at $P_1$, $P_2$ and $P_3$ are such that $A>a$ and $B>b$ at $P_1$, $A>a$ and $B>b$ at $P_2$ and $A>a$ and $B>b$ at $P_3$, leakage of sea water and ion exchange capacity depletion of the cation exchange resin of the condensate demineralizer are in progress;

(4) when the conductivity and pH each at $P_1$, $P_2$ and $P_3$ are such that $A>a$ and $B=b$ at $P_1$, $A>a$ and $B<b$ at $P_2$ and $A>a$ and $B<b$ at $P_3$, leakage of sea water and ion exchange capacity depletion of the anion exchange resin of the condensate demineralizer are in progress;

(5) when the conductivity and pH each at $P_1$, $P_2$ and $P_3$ are such that $A>a$ and $B=b$ at $P_1$, $A>a$ and $B=b$ at $P_2$ and $A>a$ and $B=b$ at $P_3$, leakage of sea water and ion exchange capacity depletion of both cation exchange resin and anion exchange resin of the condensate demineralizer are in progress; and (6) when the conductivity and pH each at $P_1$, $P_2$ and $P_3$ are such that $A=a$ and $B=b$ at $P_1$, $A>a$ and $B>b$ at $P_2$ and $A>a$ and $B>b$ at $P_3$, regeneration failure of the ion exchange resin of the condensate demineralizer is in progress.

Another system for determining a correlation between the conductivity and pH according to the present invention is a system for water chemistry diagnosis in a boiling water atomic power plant which comprises statistically deriving a correlation between the conductivity and pH at the respective times of measurement as a linear regression line, classifying the thus obtained regression line from its inclination into any of four cases consisting of a case of positive inclination, a case of negative inclination, a case of zero or infinity and a case of failure to obtain a linear relationship due to a poor correlation, and discriminating and diagnosing causes of anomaly in progress on the basis of the thus obtained correlationship between the conductivity and pH through on-line.

Specifically, the above-mentioned system for water chemistry diagnosis can be constituted by statistically deriving a correlation between the logarithm of conductivity and pH value at the respective times of measurement as a linear regression line, classifying the thus obtained regression line from its inclination into any of four cases consisting of a case that the inclination is about $+1$, a case that the inclination is about $-1$, a case that the absolute value of inclination is much smaller or larger than 1, and a case that no linear relationship is obtained due to poor correlations, and discriminating and diagnosing causes of anomaly in progress on the basis of the thus obtained correlationship through on-line.

An apparatus for carrying out these methods comprises at least one pair of a conductivity meter and a pH meter for measuring the conductivity and pH of primary cooling water in a boiling water atomic power plant, respectively, a means of receiving measurement data of conductivity and pH at each time of measurement and computing a correlation between the conductivity and pH, and a means of analyzing the correlation at each of sampling points from the correlation when the computed conductivity or pH is changed.

The present invention will be explained in detail below, referring to drawings.

EXAMPLE 1

Figure 1:
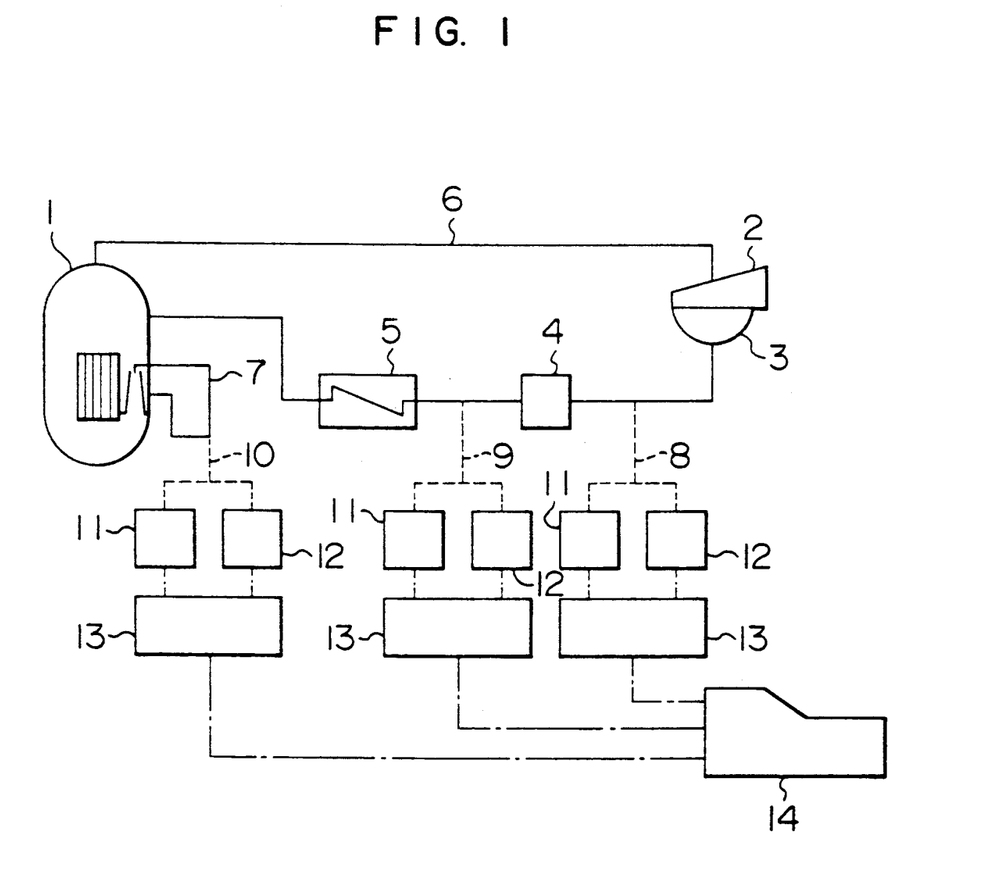
FIG. 1 shows a basic structure of the present invention as applied to a boiling water atomic power plant.

FIG. 1 shows the basic structure of an apparatus according to the present invention, as applied to a boiling water atomic power plant, where numeral 1 is a nuclear reactor, 2 a turbine, 3 a condenser, 4 a condensate demineralizer, 5 a feedwater heater, 6 a primary cooling water system, 7 a recirculation system, 8, 9 and 10 cooling water sampling lines at a point upstream of the condensate demineralizer, a point downstream of the condensate demineralizer and a point downstream of the feedwater heater, respectively, 11 pH meters, 12 conductivity meters, 13 a means of computing a correlation between the conductivity and pH, and 14 a means of analyzing the correlation at the respective sampling points.

Data of pH and conductivity measured in the sampling lines 8, 9 and 10 are input into the computing means 13 to compute mutual response characteristics when the conductivity or pH is changed. More specifically, measurement values of pH and conductivity at each time of measurement when changes in water quality are in progress are compared with the values at the time of normal operation, and the thus obtained response characteristics are classified into three cases, i.e. case of increase from the values at the time of normal operation, case of decrease therefrom and case of no change. The result is input into the correlation-analyzing means 14 to discriminate and diagnose causes of anomaly for the water quality changes.

Figure 2:
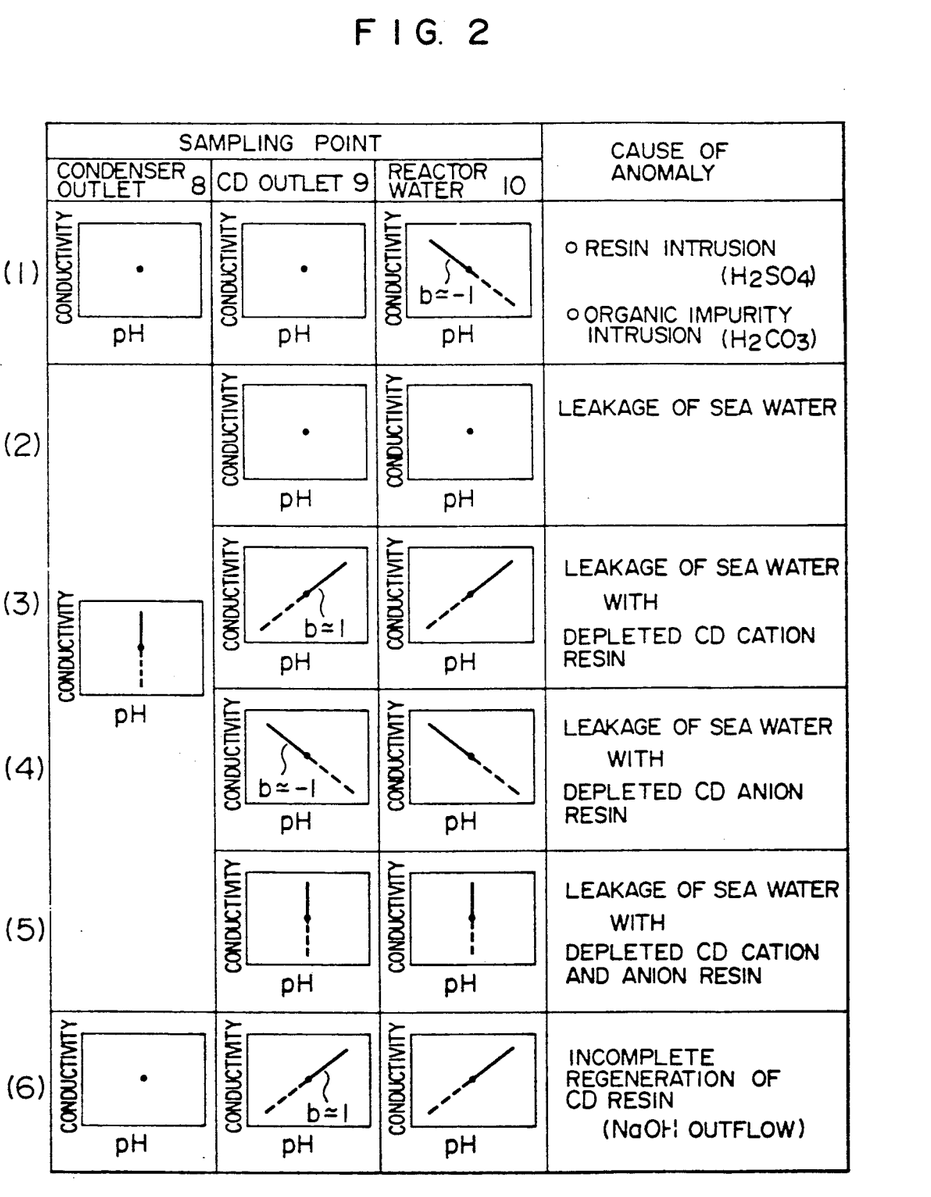
FIG. 2 is a summary diagram showing mutual response characteristics, which is used for discriminating causes of anomaly in the present invention, when the conductivity or pH is changed.

For example, 6 major causes of anomaly which has a possibility to develop in the feedwater-condensate system can be discriminated and diagnosed, as shown in FIG. 2.

(1) In case of intrusion of resin or intrusion of organic impurities, water quality is not influenced upstream of the feedwater heater, but when the intruded resin or organic impurities flows into the nuclear reactor, sulfuric acid or carbonic acid is formed, and thus the conductivity is increased and pH is lowered in the sampling line 10, as compared with those at the time of normal operation.

(2) In case of leakage of sea water, the conductivity is increased in the sampling line 8, but pH is not influenced because the intruded impurities are neutral salts containing NaCl as the main component. The intruded impurities are removed by the condensate demineralizer (CD)4, giving no influence on the water quality of sampling lines 9 and 10.

(3) In case of depletion of the ion exchange capacity of cation exchange resin in the condensate demineralizer 4, NaCl flows out after conversion to a chemical form of NaOH and thus both conductivity and pH increase in the sampling lines 9 and 10.

(4) In case of depletion of the ion exchange capacity anion exchange resin in the condensate demineralizer 4, NaCl flows out after conversion to a chemical form of HCl, and thus the conductivity increases and pH decreases in the sampling lines 9 and 10.

(5) In case of depletion of the ion exchange capacity of both cation and anion exchange resin in the condensate demineralizer 4, NaCl flows out as such and thus the sampling lines 8, 9 and 10 show identical changes.

(6) In case of poor regeneration state of ion exchange resin in the condensate demineralizer to discharge NaOH used for the regeneration, both conductivity and pH increase in the sampling lines 9 and 10, while the water quality is not changed in the sampling line 8.

As explained above, combinations of changes in the conductivity and pH at three points in the sampling lines 8, 9 and 10 are differentiated from one another by causes of anomaly in progress, and thus the causes of anomaly can be discriminated and diagnosed by the water chemistry data.

EXAMPLE 2

In the foregoing Example, measurement values of the conductivity and pH at each time of measurement when changes in water quality are in progress are compared with those at the time of normal operation at each sampling point and the mutual response characteristics when the conductivity or pH is changed are classified into three cases, i.e. case of increase from the values at the time of normal operation, case of decrease therefrom and case of no change.

In case of large fluctuations in water chemistry data, the measurement values at the respective times of measurement can be accumulated and statistically treated to obtain a response characteristic of higher reliability. That is, it is possible to statistically derive a correlation between the logarithm of conductivity and pH at the respective times of measurement as a linear regression line and classify the thus obtained regression line from the inclination into four cases, i.e. case that the inclination is about $+1$, case that the inclination is about $-1$, case that the absolute value of inclination is much smaller or larger than 1 and case that no linear relationship is obtained due to a poor correlation.

Figure 3:
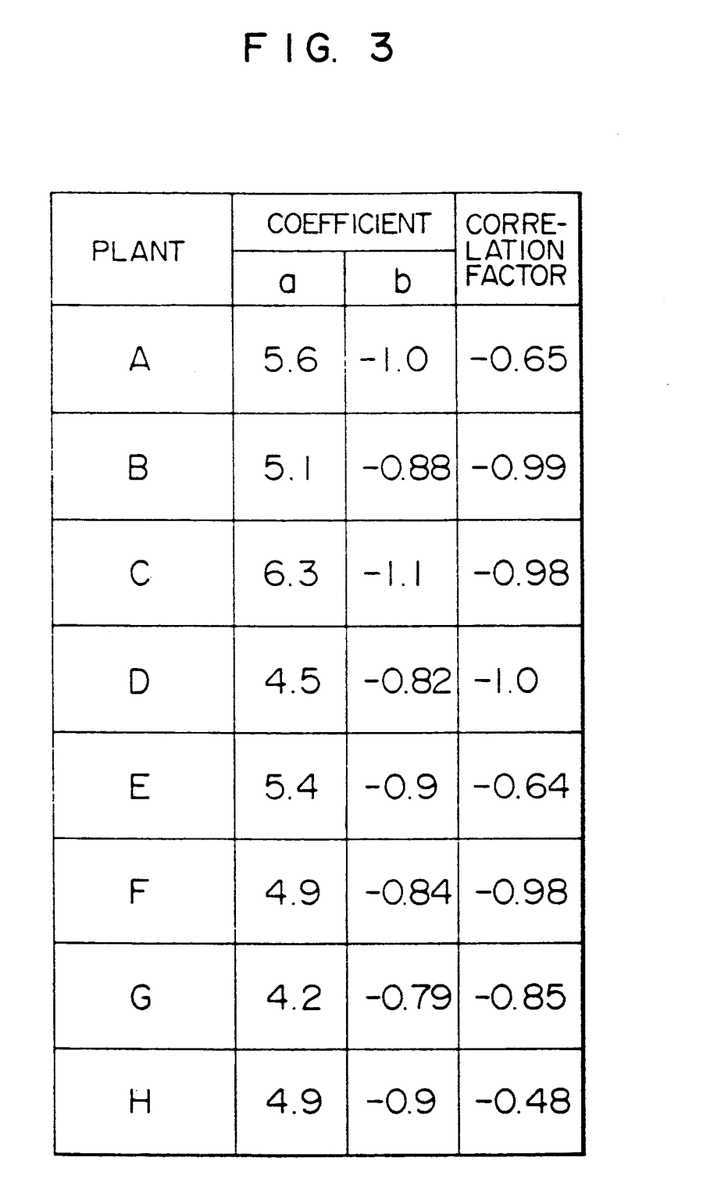
FIG. 3 is a diagram showing that the mutual response characteristics can be quantitatively computed and evaluated by a statistical analysis when the conductivity or pH is changed.

FIG. 3 shows the result of statistical analysis of mutual response characteristics in changes in the conductivity and pH at the time of leakage of sea water in a plurality of plants in USA by the above-mentioned method. Presuming that the conductivity of reactor water at the time of normal operation before the start to change in the water quality (pH≈7) be A, the conductivity at a time t when the water quality starts to change be X(t), and pH be Y(t) at that time, a correlation between log (X(t)−A) and Y(t) is statistically analyzed as a linear regression line to derive the following regression line.

$$\log (X(t)-A) = a + b \cdot Y(t)$$

As shown in FIG. 3, the regression line in a plurality of plants are substantially in a good agreement with one another and the inclination of the straight lines is ≈ −1.

Likewise in case of intrusion of NaOH, the inclination is ≈1. Thus, the correlation between the conductivity and pH shown in FIG. 2 can be quantitatively computed and evaluated by the above-mentioned statistical analysis.

EXAMPLE 3

Figure 4:
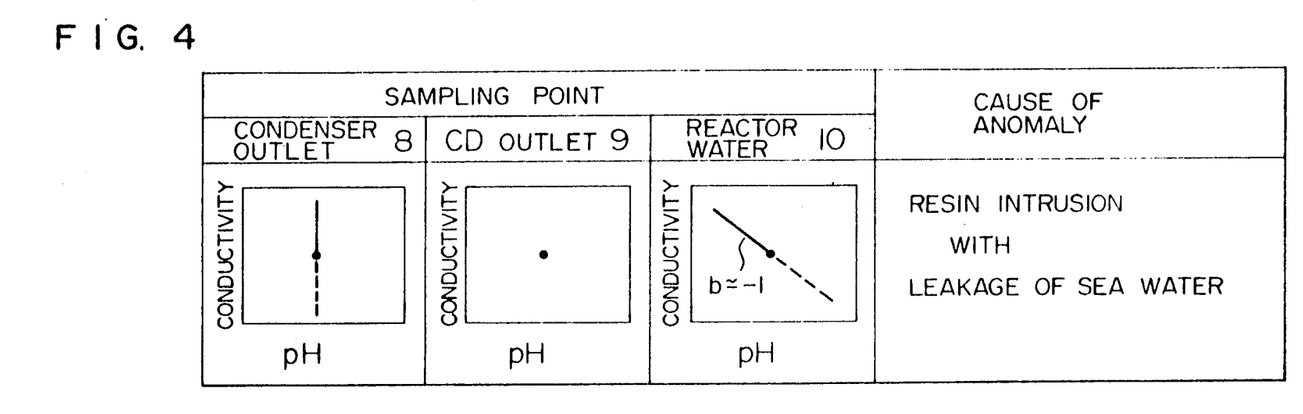
FIGS. 4, 5 and 6 are diagrams showing other embodiments of combinations of correlations.
Figure 5:
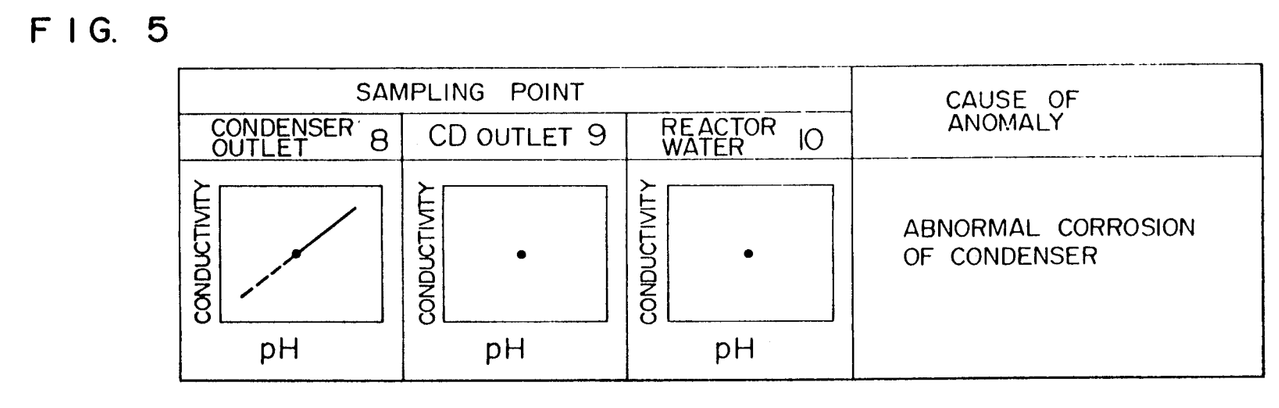

In the foregoing Examples 1 and 2, it is intended to discriminate 6 cases as causes of anomaly, and combinations of correlations between the conductivity and pH at the three sampling points shown in FIG. 2 amount to 64 (=4×4×4). Thus, the corresponding anomalies can be discriminated and diagnosed. For example, a combination of intrusion of resin and leakage of sea water taking place together is given in FIG. 4. On the other hand, when abnormal corrosion occurs in the condenser, a metal oxide is formed by the reaction shown by the following equation and the water at the condenser outlet turns alkaline Thus, a combination of correlations shown in FIG. 5 appears:

$$2Fe + O_2 + 2H_2O \rightarrow 2Fe^{2+} + 4OH^-$$

In the foregoing Examples, the sampling points are three, and when causes of anomaly to be discriminated are less, combinations of correlations at one or two sampling points as appropriately selected can discrimate the causes of anomaly, whereas in case of more causes of anomaly, they can be discriminated by combinations of correlations at more than three sampling points. For example, in order to discriminate 6 causes of anomaly given in FIG. 6 it is also possible to discriminate and diagnose them by combinations of correlations at the condenser outlet 8 and reactor water position 10.

Figure 6:
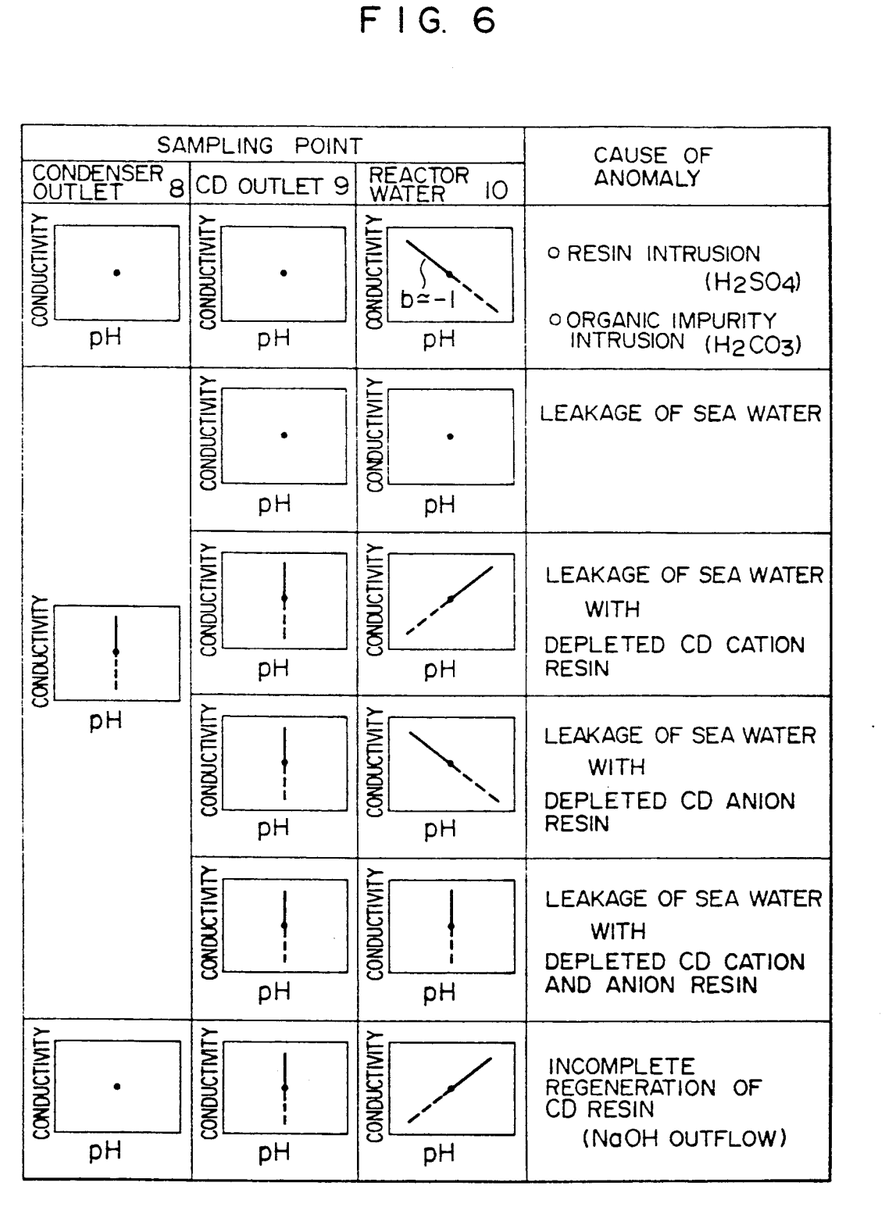

Furthermore, when the measurement value of pH at the condenser outlet or condensate demineralizer outlet cannot be obtained in FIG. 2, it is also possible to obtain a correlation between the conductivity and pH on the assumption of pH=7, and discriminate and diagnose the causes of anomaly by combinations of correlations at the respective sampling points as shown in FIG. 6.

Figure 7:
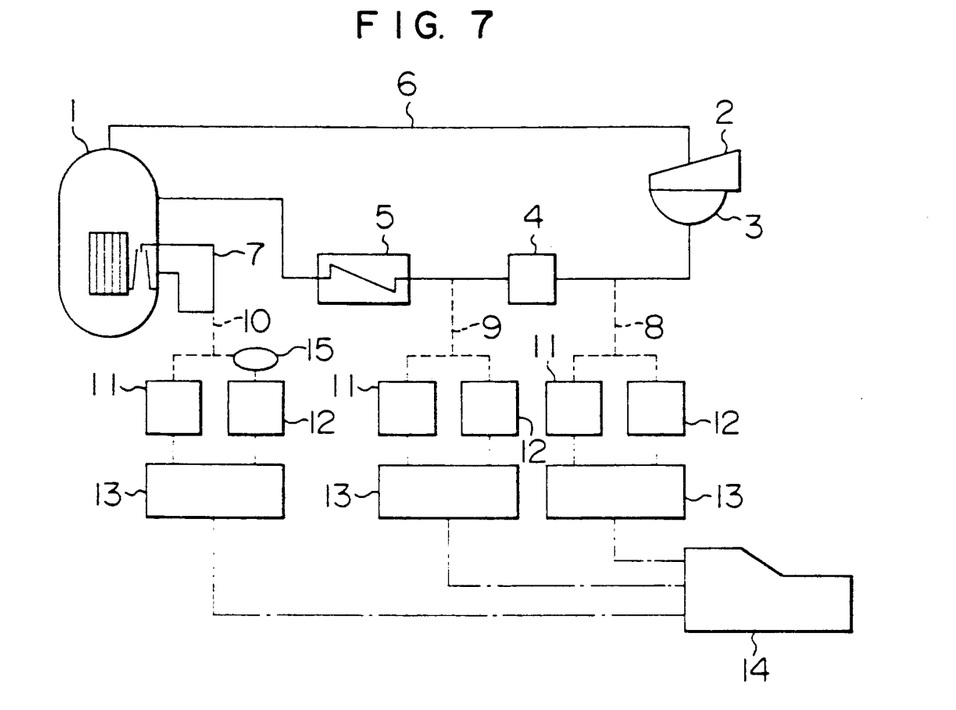
FIG. 7 shows a necessary structure of apparatuses for discriminating resin leakage or intrusion of organic impurities through on-line.

In the case of anomaly (1) as given before or in Example 1 or FIG. 2, occurrence of anomalies can be diagnosed, but it is impossible to more accurately discriminate whether the anomaly is caused by intrusion of resin or by intrusion of organic impurities through on-line. However, as shown in FIG. 7, it is possible to discriminate and identify species of ions, i.e. subfate ions or carbonate ions, by additionally providing a high temperature conductivity meter 15 working at a higher temperature than room temperature in the sampling line 10 besides the room temperature conductivity meter.

Figure 8:
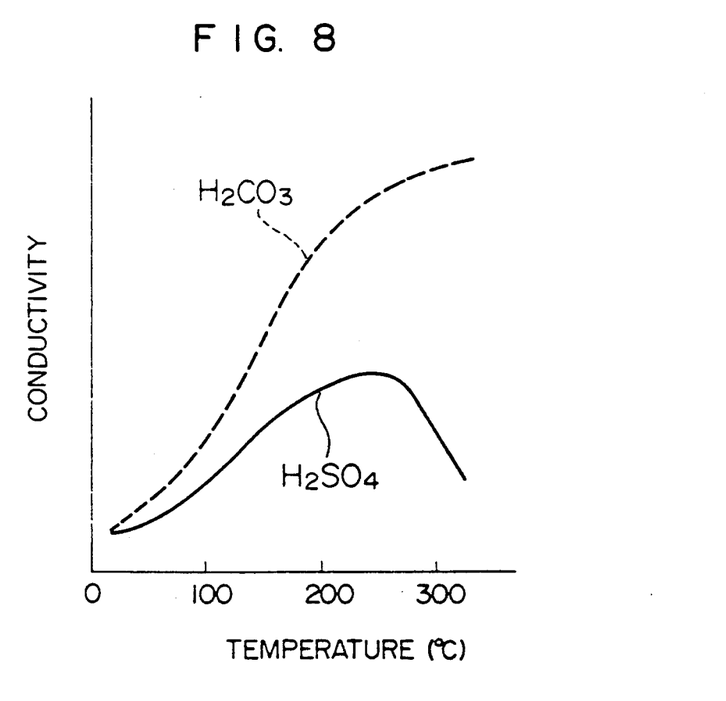
FIG. 8 is a diagram showing the dependency of conductivity upon temperature in the cases of sulfuric acid and carbonic acid.

That is, as shown in FIG. 8, sulfuric acid and carbonic acid show different temperature dependencies of conductivity due to the difference in the anion species, though they have the same room temperature conductivity, and thus they can be discriminated and identified by comparing differences between the room temperature conductivity and the high temperature conductivity thereof.

Figure 9:
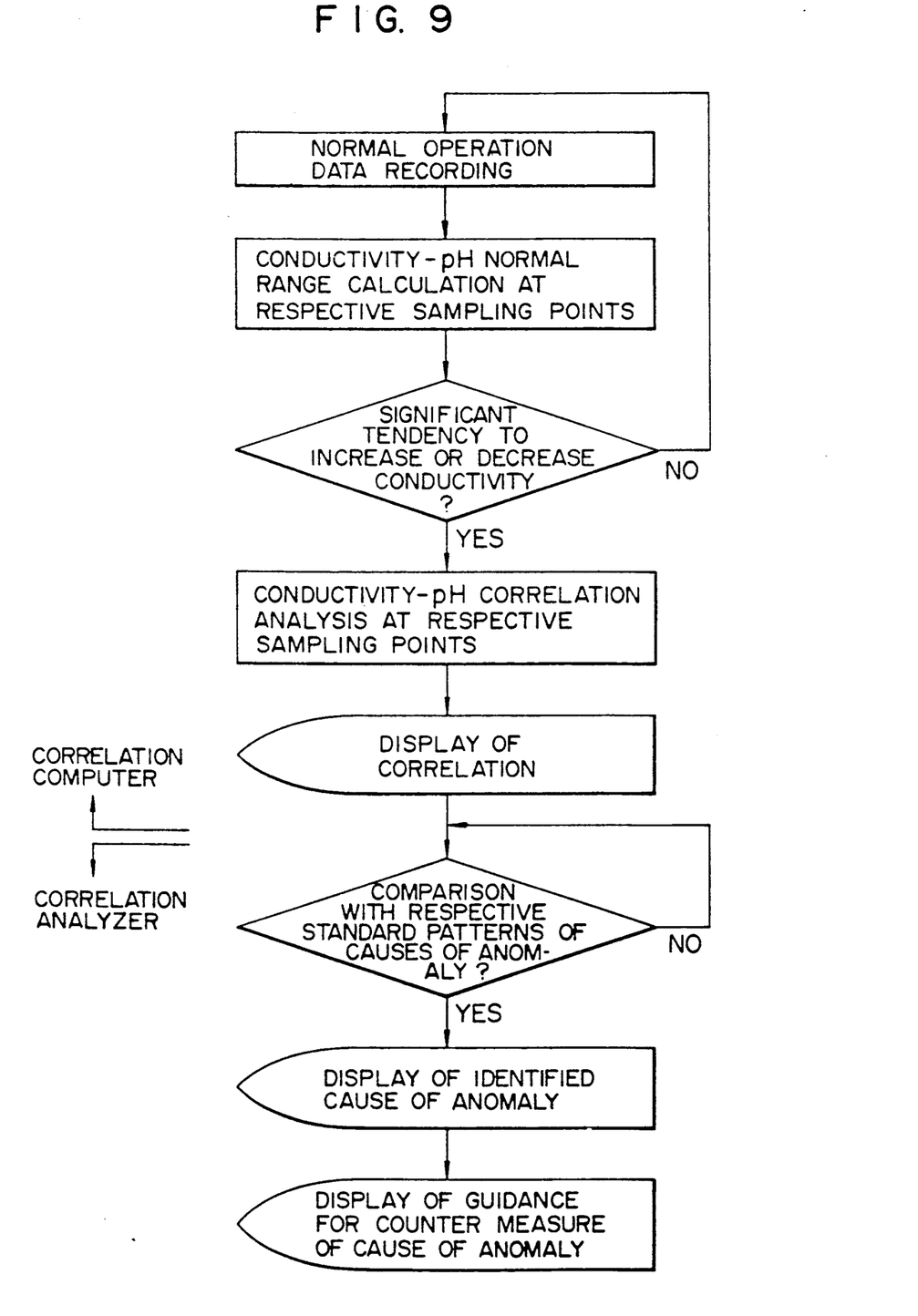
FIG. 9 is a flow chart of correlation computation and analytical data processing when the present invention is applied to an on-line diagnosis.
Figure 10:
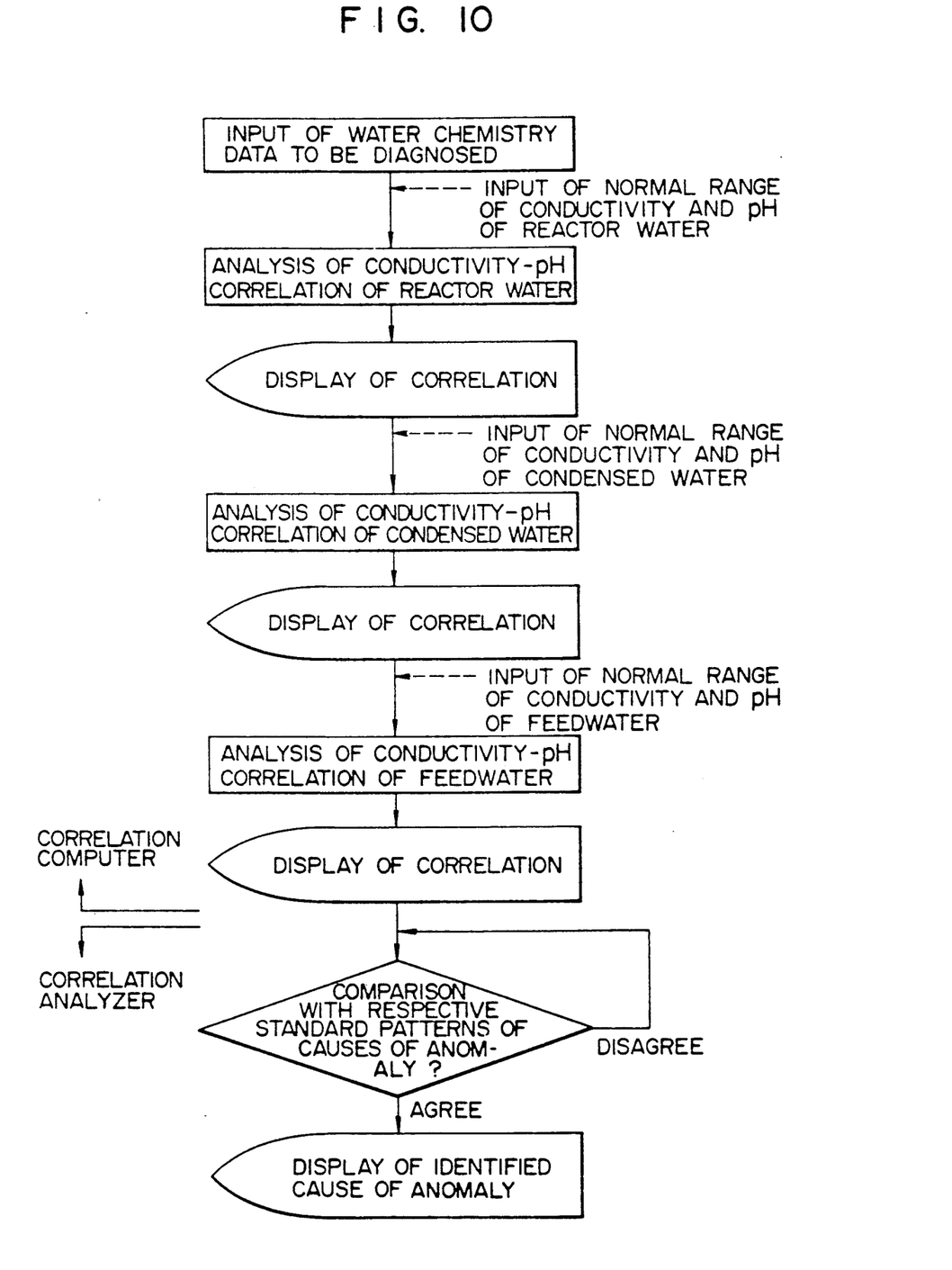
FIG. 10 is a flow chart of correlation computation and analytical data processing when the present invention is applied to an off-line diagnosis.

FIGS. 9 and 10 show specific processing flow charts of a correlation-computing means and a correlation-analyzing means in the foregoing diagnosis systems.

The processing flow diagram of FIG. 9 shows a data processing flow in the correlation-computing means 13 and the correlation-analyzing means 14 in computing correlations between the conductivity and pH through on-line and automatically diagnosing causes of anomaly in water quality.

At first, normal ranges of conductivity and pH at the respective sampling points are automatically calculated from the water chemistry data at the time of normal operation, because, even if the component apparatus members are normally operated, there is a possibility that a correlation between the conductivity and pH clearly showing an abnromal state is not obtained due to the presence of fluctuations in the conductivity and pH to some extent, when the correlation is obtained from all the measurement values. Thus, only data over the normal ranges are used in the computation of correlation by comparing the measurement data of conductivity and pH with the normal ranges at the respective sampling points. When a significant tendency to increase or decrease in the conductivity is detected in the measurement data of conductivity, a correlation between the conductivity and pH are automatically computed at the respective sampling points, followed by display of the computed correlation. The computed correlation is successively compared with the standard pattern of the individual causes of anomaly in the correlation-analyzing means and causes of anomaly found to be identical are displayed as a result of diagnosis. Furthermore, countermeasure against the identified causes of anomaly is displayed as a guidance. When a significant tendency to increase or decrease for the measurement data of conductivity is continued, the foregoing computation and analysis of correlation are repeated.

The present diagnosis system is suitable for on-line diagnosis, but can be also applied to off-line analysis of past operating data to diagnose causes of anomaly in water quality.

The processing flow chart of FIG. 10 shows a process flow for computing and analyzing the correlation between the conductivity and pH through off-line on the basis of past data at three sampling points of reactor water (downstream of the feedwater heater), condensate (upstream of the condensate demineralizer) and feed water (downstream of the condensate demineralizer).

In the off-line diagnosis, the normal ranges of conductivity and pH at the respective sampling points are input from a key board by conversational mode and a correlation between the conductivity and pH at the respective sampling points is computed with abnormal data deviated from the normal ranges, and displayed. The result of correlations at the respective sampling points is input into the correlation-analyzing means to identify and display the causes of anomaly in the same manner in the on-line diagnosis.

When the present invention is applied to on-line diagnosis, it is possible to exactly detect anomalies in progress in the operating state or component apparatus members of an atomic power plant or any causes of anomaly on the basis of only continuously monitored on-line data such as conductivity and pH and take the necessary countermeasure against the anomalies.

When the present invention is also applied to a system for diagnosing causes of anomaly in water quality on the basis of past operating data, it is possible to more exactly diagnose causes of anomaly in water quality through off-line.

What is claimed is:

1. A method for water chemistry diagnosis for detection of anomalies from changes in water quality in a boiling water atomic power plant comprising a nuclear reactor, a turbine, a condenser, a condensate demineralizer and a feedwater heater as main component members, which comprises inputting measurement values of conductivity and pH of primary cooling water in the boiling water atomic power plant through on-line, statistically deriving a correlation between logarithm of conductivity and pH at respective times of measurement as a linear regression line, classifying the thus obtained regression line from its inclination into any of four cases consisting of a case that the inclination is about $+1$, a case that the inclination is about $-1$, a case that the absolute value of inclination is much smaller or larger than 1, and a case that a linear relationship fails to obtain due to a poor correlation, and combining a correlationship between the conductivity and pH, thereby discriminating and diagnosing causes of anomaly in progress through on-line.

2. A method for water chemistry diagnosis in an atomic power plant, which comprises measuring conductivity and pH at a plurality of sampling points in different water quality states, establishing a correlation between the conductivity and pH at the respective sampling points, at substantially the same time and comparing a pattern of combinations of the correlations between the conductivity and pH at a plurality of the sampling points with a standard pattern of individual causes of anomaly prepared in advance, thereby identifying causes of anomaly.

3. A method for water chemistry diagnosis in an atomic power plant, which comprises measuring conductivity and pH at at least one point susceptible to changes in water quality when component apparatus members of the atomic power plant have a failure, establishing a correlation between logarithm of the conductivity and pH, and comparing the established correlation with a correlation between logarithm of conductivity and pH for individual causes of anomaly prepared in advance, thereby checking an agreement thereby and identifying causes of anomaly.

4. A method according to claim 2 or 3, wherein only the conductivity and pH over the normal ranges of conductivity and pH predetermined at the sampling points are used for establishing the correlation.

5. An apparatus for water chemistry diagnosis in a boiling water atomic power plant, which comprises at least one pair of a conductivity meter and a pH meter for measuring conductivity and pH of primary cooling water in the boiling water atomic power plant, respectively; a means of computing a correlation between conductivity and pH from input measurement data of conductivity and pH at substantially the same time; and a means of analyzing a correlation at respective sampling points from the computed correlation when the conductivity or pH changes.

6. An apparatus according to claim 5, wherein the conductivity meter includes at least one high temperature conductivity meter to discriminate from a difference in measurement data between the high temperature conductivity meter and a room temperature conductivity meter whether intrusion is by resin or by organic impurities.

7. An apparatus according to claim 5, wherein a plurality of pairs of a conductivity meter and a pH meter for measuring conductivity and pH of primary cooling water in the boiling water atomic power plant are provided, respective ones of the pairs of the conductivity meter and pH meter being provided at different sampling points of the atomic power plant at which the water quality varies due to passage of the water through different components of the atomic power plant, the means of computing a correlation between measured conductivity and measured pH from input measurement data of conductivity and pH from the respective pairs of the conductivity meter and pH meter at the different sampling points, and the means of analyzing a correlation at respective sampling points including means for comparing a pattern of combinations of the computed correlations at respective sampling points with a standard pattern of previously prepared correlations indicative of causes of anomaly.

8. A method for water chemistry diagnosis in an atomic power plant comprising the steps of:

measuring conductivity and pH of water of the atomic power plant at least one sampling point;

establishing a correlation between the measured conductivity and the measured pH at the at least one sampling point at substantially the same time; and analyzing the established correlation between the measured conductivity and the measured pH at the at least one sampling point for indicating a cause of anomaly.

9. A method according to claim, wherein a conductivity meter and a pH meter are each provided at three points consisting of a point $P_1$ upstream of the condensate demineralizer, a point $P_2$ downstream of the condensate demineralizer and a point $P_3$ downstream of the feedwater heater, conductivity A and pH B are measured at the three points through on-line, and on the basis of conductivity a and pH b at the time of normal operation as standard it is discriminated and diagnosed through on-line that:

(1) when the conductivity and pH each at $P_1$, $P_2$ and $P_3$ are such that $A=a$ and $B=b$ at $P_1$, $A=a$ and $B=b$ at $P_2$ and $A>a$ and $B<b$ at $P_3$, one of leakage of ion exchange resin of the condensate demineralizer and intrusion of organic impurities is in progress;

(2) when the conductivity and pH each at $P_1$, $P_2$ and $P_3$ are such that $A>a$ and $B=b$ at $P_1$, $A=a$ and $B=b$ at $P_2$ and $A=a$ and $B=b$ at $P_3$, leakage of sea water is in progress;

(3) when the conductivity and pH each at $P_1$, $P_2$ and $P_3$ are such that $A>a$ and $B>b$ at $P_1$, $A>a$ and $B>b$ at $P_2$ and $A>a$ and $B>b$ at $P_3$, leakage of sea water and ion exchange capacity depletion of cation exchange resin of the condensate demineralizer are in progress;

(4) when the conductivity and pH each at $P_1$, $P_2$ and $P_3$ are such that $A>a$ and $B=b$ at $P_1$, $A>a$ and $B<b$ at $P_{22}$ and $A>a$ and $B<b$ at $P_3$, leakage of sea water and ion exchange capacity depletion of anion exchange resin of the condensate demineralizer are in progress;

(5) when the conductivity and pH each at $P_1$, $P_2$ and $P_3$ are such that $A>a$ and $B=b$ at $P_1$, $A>a$ and $B=b$ at $P_2$ and $A>a$ and $B=b$ at $P_3$, leakage of sea water and ion exchange capacity depletion of both cation exchange resin and anion exchange resin of the condensate demineralizer are in progress; and (6) when the conductivity and pH each at $P_1$, $P_2$ and $P_3$ are such that $A=a$ and $B=b$ at $P_1$, $A>a$ and $B>b$ at $P_2$ and $A>a$ and $B>b$ at $P_3$, regeneration failure of ion exchange resin of the condensate demineralizer is in progress.

10. A method according to claim 8, wherein the step of analyzing includes comparing the established correlation between the measured conductivity and the measured pH at the at least one sampling point with a standard pattern of previously prepared correlations indicative of causes of anomaly.

11. A method according to claim 10, further comprising the step of identifying a cause of anomaly in accordance with a result of the comparison.

12. A method according to claim 11, further comprising the step of generating information for correcting the identified cause of the anomaly.

13. A method according to claim 10, wherein the step of measuring conductivity and pH at the at least one sampling point includes measuring conductivity and pH at a plurality of different sampling points of the atomic power plant at which the water quality varies due to passage of the water through different components of the atomic power plant, the step of establishing a correlation includes establishing a correlation between the measured conductivity and the measured pH at the respective sampling points, and the step of comparing includes comparing a pattern of combinations of the established correlations between the measured conductivity and the measured pH at the respective sampling points with the standard pattern of previously prepared correlations indicative of causes of anomaly.

14. A method according to claim 13, wherein the step of establishing a correlation includes obtaining a linear regression line, and further comprising the step of classifying the thus obtained regression line in accordance with an inclination thereof into any of four cases consisting of a case of positive inclination, a case of negative inclination, a case of zero or infinity and a case of failure to obtain a linear relationship due to a poor correlation.

* * * * *